April 21, 1936.  W. F. SMITH  2,038,010

BALL BEARING

Filed Nov. 20, 1934

William F. Smith
INVENTOR

BY Paul Kolisch
ATTORNEY

Patented Apr. 21, 1936

2,038,010

UNITED STATES PATENT OFFICE 2,038,010

BALL BEARING

William F. Smith, Poughkeepsie, N. Y., assignor to The Federal Bearings Co., Inc., Poughkeepsie, N. Y., a corporation of New York Application November 20, 1934, Serial No. 753,824

7 Claims. (Cl. 308—201)

This invention relates to new and useful improvements in ball bearings, and more particularly to ball bearings having self-oiling ball retainers.

Compositions that may be used as self-oiling retainers or other bearing surfaces contain lubricants such as oil which, at certain temperatures, is forced to the surface of the material and provides a lubricating film. One of the commercially successful compositions consists of powdered copper, zinc and graphite which are thoroughly mixed and then molded to the desired shapes. The molded material is heat treated to render the mass more homogeneous and to improve its physical properties, and then it is etched with acid to open its surface pores. The acid is neutralized by washing in gasoline and other solutions, whereupon the material is immersed in oil at a temperature of 230° F. for a period of thirty minutes. After such immersion the material will be found to retain approximately one-third of its volume of oil. When the bearing heats up the oil is forced to the surface and forms, in conjunction with the graphite, a lubricating film. Upon cooling, the lubricant is again reabsorbed by capillary action.

When the retainer of a ball bearing is made of such material the film of lubricant forms at those points of the retainer where maximum rubbing velocities exist. The balls transfer this film to the races.

Although ball bearings having such self-oiling retainers need no seals to prevent the escape of lubricant and will operate for a long period of time without any extraneous source of lubricant, the life of such bearings will be materially increased if, during the initial stages of its operation, extraneous lubricant is added and if the exposed face of the bearing is sealed, not so much to prevent the escape of lubricant as to prevent the penetration of solid particles into the bearing.

One of the features of the present invention has to do with the solution of these problems.

Materials suitable for self-oiling bearings have a highly abrasive action on the cutting edges of machining tools. To avoid excessive wear and tear on machine tools, in accordance with the present invention the retaining ring is cast in one piece without any machining operations, the shape and construction of the ring being such as to minimize the cost and maintenance of dies and tools.

These and other features of the invention will more fully appear from the following detailed description of a preferred embodiment thereof and the appended claims.

In the drawing, Fig. 1 is a top plan view of the assembled bearing;

Figure 1:
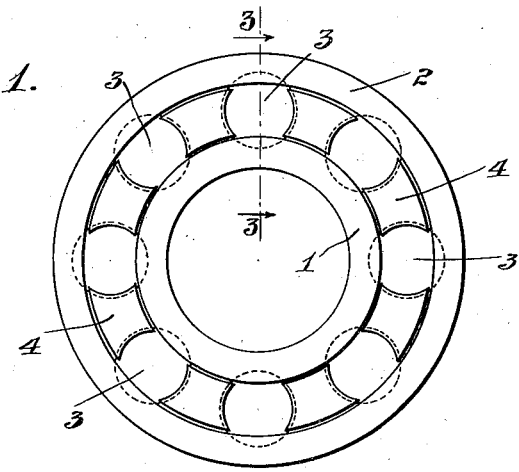
Figure 2:
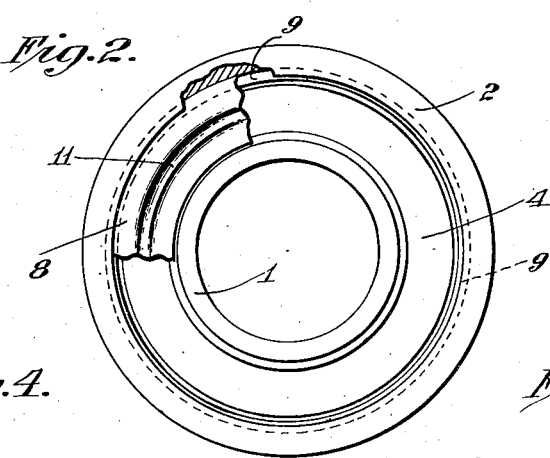
Fig. 2 is a bottom plan view of the bearing with part of the seal broken away.
Figure 4:
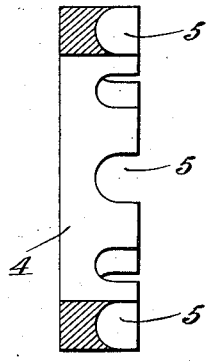
Fig. 4 is a vertical cross-section of the retainer ring proper.

The ball bearing consists of an inner race or cone 1 and outer races 2 between which balls 3 are held spaced from one another by means of a retainer ring 4.

The retainer ring 4 is molded of the above described self-oiling material with pockets 5 open at the top. The opening of the pockets is wide enough to receive the balls and their depth is such that the balls protrude above the pockets. The thickness of the retainer 4 is also less than the diameter of the ball. The surfaces of the balls protruding beyond the preformed retainer ring 4 ride in the usual raceways 6 and 7 provided in the inner and outer races, respectively.

The ball bearing is sealed by means of a steel sealing ring 8 which is snapped into position with one edge engaging a groove 9 in the outer race 2 and the other edge abutting a shoulder 10 formed in the inner race. The sealing ring 8 is formed with a corrugation 11 which facilitates proper positioning of the sealing ring without undue strain on the outer race 2, since the corrugation 11 allows for the compression of the seal. The corrugation formed in the sealing ring 8 engages the bottom of the retaining ring 4 over a small area thereof, reducing to a minimum friction during operation.

In order to allow for variations in fabrication and yet insure proper seating of the balls, the various elements of the structure are proportioned in the following manner:

The diameter of a ball pocket in the retainer ring 4 (as viewed in Fig. 1) is only slightly larger than the diameter of a ball. Assuming, for instance, a ball diameter of .2656, the diameter of the pocket will be .269. It has been the practice to shape the side walls of the pocket to the radius of a circle, i. e., in the present case the radius of the retainer pocket would be .1345. However, owing to the practical necessity of grinding the inner and outer races 1 and 2 with a tolerance of, say ±.010, the walls of the ball pocket formed by tracks 6 and 7 may have a much larger diameter than that of the balls. With a closely fitting pocket in the retainer 4, the balls, finding no support in the walls of tracks 6 and 7, would enlarge the retainer pockets. After a relatively brief period of operation, the balls would start to rattle and the bearing would become damaged.

To guard against this, the walls of the retainer form pockets of substantially ovoidal cross-section. The radius, outside of the center line of the retainer 4, may be .1406. The balls will, therefore, accommodate themselves to track pockets of varying substantially circular cross-sections and yet be held against rattling by the retainer pocket along the center line of retainer ring 4.

It will be apparent that the tools and dies needed for preforming the retainer ring 4 will be simple. No special tools are required for closing the retainer ring around the balls during the assembly of the bearing. This will not only save a step in the fabrication of the bearing, but avoid one danger to the life of the bearing, since it often happens that metallic particles lodged between the bearing surfaces during the forming operation are not washed out. In taking apart a bearing, the retainer ring 4 may be pressed out in the direction of the seal 8 without mutilating or deforming the ball retainer.

Figure 3:
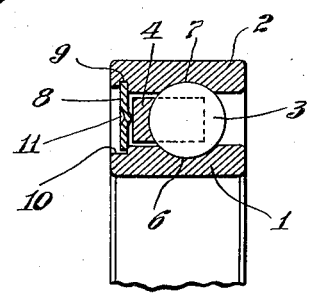
Fig. 3 is a sectional view along lines 3—3 of Fig. 1.

Cleaning fluid forced into the bearing from the top (Fig. 1) will reach all parts of the bearing and will flow out through the space between seal 8 and shoulder 10 in the cone 1. The bearing is mounted with its right-hand side (Fig. 3) covered and preferably communicating with a reservoir (not shown) of lubricating substance. The seal 8 protects the bearing from dust and the lubricant flowing into the bearing from the reservoir will materially prolong its life.

What is claimed is:

1. In a ball bearing, an inner and an outer race provided with raceways for the balls, and a rigid ball retainer between said races with pockets for the balls, the body of said retainer forming two sides of the pockets which are of ovoidal cross-section.

2. In a ball bearing, an inner and an outer race provided with raceways for the balls, a rigid ball retainer between said races with pockets for the balls having larger openings than the ball diameter, the body of said retainer forming two sides of the pockets for the balls, the retainer pockets having an ovoidal cross-section.

3. In a ball bearing, an inner and an outer race provided with raceways for the balls, the two raceways forming two sides of ball pockets of circular cross-section, and a rigid ball retainer between said races with pockets for the balls, the body of said retainer forming two other sides of the pockets for the balls, the retainer pockets having an ovoidal cross-section.

4. In a ball bearing, an inner and an outer race provided with raceways for the balls, the two raceways forming two sides of ball pockets of circular cross-section, a rigid ball retainer of self-lubricating material between said races with pockets for the balls having larger openings than the ball diameter, the body of said retainer forming two other sides of the pockets for the balls, the retainer pockets having an ovoidal cross-section.

5. In a ball bearing, an inner and an outer race, a preformed rigid ball retainer ring between the races having pockets formed therein the cross-section of which is substantially ovoidal, the width and height of the retainer surrounding said pockets being less than the diameter of the balls.

6. In a ball bearing, an inner and an outer race, a preformed rigid ball retainer ring between the races having pockets formed therein the cross-section of which is substantially ovoidal, the width and height of the retainer surrounding said pockets being less and the openings of said pockets being greater than the diameter of the balls.

7. In a ball bearing, an inner and an outer race, a rigid ball retainer ring preformed of self-lubricating materials between the races having pockets formed therein the cross-section of which is substantially ovoidal, the width and height of the retainer surrounding said pockets being less and the openings of said pockets being greater than the diameter of the balls.

WILLIAM F. SMITH.